(12) United States Patent
Liu

(10) Patent No.: US 6,879,738 B2
(45) Date of Patent: Apr. 12, 2005

(54) METHOD AND APPARATUS FOR MODULATING AN OPTICAL BEAM IN AN OPTICAL DEVICE

(75) Inventor: Ansheng Liu, Cupertino, CA (US)

(73) Assignee: Intel Corporation, Santa Clara, CA (US)

(*) Notice: Subject to any disclaimer, the term of this patent is extended or adjusted under 35 U.S.C. 154(b) by 219 days.

(21) Appl. No.: 10/374,151

(22) Filed: Feb. 24, 2003

(65) Prior Publication Data

US 2004/0165807 A1 Aug. 26, 2004

(51) Int. Cl.⁷ .......................... G02F 1/035; G02F 1/225
(52) U.S. Cl. ............................ 385/3; 385/27; 385/5; 385/9; 385/14; 359/244; 359/237; 359/279
(58) Field of Search ............................ 385/2, 3, 5, 8, 385/9, 13, 27, 39, 45; 359/237, 238, 241, 244, 245, 279

(56) References Cited

U.S. PATENT DOCUMENTS

| | | | |
|---|---|---|---|
| 6,753,996 B1 * | 6/2004 | Shibata et al. | 359/279 |
| 2004/0165807 A1 * | 8/2004 | Liu | 385/3 |

FOREIGN PATENT DOCUMENTS

| | | |
|---|---|---|
| EP | 0 717 482 A1 | 6/1996 |
| WO | PCT/US2004/002687 | 8/2004 |

OTHER PUBLICATIONS

Ratovelomanana, F. et al., "An All–Optical Wavelength––Converter with Semiconductor Optical Amplifiers Monolithically Integrated in an Asymmetric Passive Mach–Zehnder Interferometer," *IEEE Photonics Technology Letters*, vol. 7, No. 9, Sep. 1995, pp. 992–994.

Leuthold, J. et al., "All–Optical Mach–Zehnder Interferometer Wavelength Converters and Switches with Integrated Data– and Control–Signal Separation Scheme," *Journal of Lightwave Technology*, vol. 17, No. 6, Jun. 1999, pp. 1056–1065.

Temkin, H., et al., "$Ge_x Si_{1-x}$ Strained–layer Superlattice Waveguild Photodetectors Operating Near 1.3 $\mu$m", *Appl. Phys. Lett.*, vol. 48, No. 15, (Apr. 14, 1986) pp. 963–965.

Qasaimeh, O., et al., "Electroabsorption and Electrooptic Effect in SiGe–Si Quantum Wells: Realization of Low–Voltage Optical Modulators", *IEEE Journal of Quantum Electronics*, vol. 33, No. 9, (Sep. 1997) pp. 1532–1536.

* cited by examiner

Primary Examiner—Akm Enayet Ullah
Assistant Examiner—Omar Rojas
(74) Attorney, Agent, or Firm—Blakely, Sokoloff, Taylor & Zafman LLP

(57) ABSTRACT

An apparatus and method for modulating an optical beam. In one embodiment, a method according to embodiments of the present invention includes splitting first and second optical beams having first wavelength and second wavelengths, respectively, into split first and second optical beams that co-propagate through first and second waveguides disposed in semiconductor material. The first optical beam having a signal encoded thereon. Free charge carriers are generated in response to the signal encoded on the first optical beam in first and second multiple quantum well (MQW) p-i-n structures disposed in the first and second waveguides, respectively. The split second optical beams are phase shifted in response to the generated free charge carriers in the first and second MQW p-i-n structures. The phase shifted split second optical beams are combined to modulate the second optical beam.

26 Claims, 4 Drawing Sheets

METHOD AND APPARATUS FOR MODULATING AN OPTICAL BEAM IN AN OPTICAL DEVICE

BACKGROUND OF THE INVENTION

1. Field of the Invention

The present invention relates generally to optics and, more specifically, the present invention relates to modulating optical beams.

2. Background Information

The need for fast and efficient optical-based technologies is increasing as Internet data traffic growth rate is overtaking voice traffic pushing the need for optical communications. Transmission of multiple optical channels over the same fiber in the dense wavelength-division multiplexing (DWDM) systems and Gigabit (GB) Ethernet systems provide a simple way to use the unprecedented capacity (signal bandwidth) offered by fiber optics. Commonly used optical components in the system include wavelength division multiplexed (WDM) transmitters and receivers, optical filter such as diffraction gratings, thin-film filters, fiber Bragg gratings, arrayed-waveguide gratings, optical add/drop multiplexers, wavelength converters, lasers and optical switches. Optical switches may be used to modulate optical beams. Two commonly found types of optical switches are mechanical switching devices and electro-optic switching devices.

Mechanical switching devices generally involve physical components that are placed in the optical paths between optical fibers. These components are moved to cause switching action. Micro-electronic mechanical systems (MEMS) have recently been used for miniature mechanical switches. MEMS are popular because they are silicon based and are processed using somewhat conventional silicon processing technologies. However, since MEMS technology generally relies upon the actual mechanical movement of physical parts or components, MEMS are generally limited to slower speed optical applications, such as for example applications having response times on the order of milliseconds.

In electro-optic switching devices, voltages are applied to selected parts of a device to create electric fields within the device. The electric fields change the optical properties of selected materials within the device and the electro-optic effect results in switching action. Electro-optic devices typically utilize electro-optical materials that combine optical transparency with voltage-variable optical behavior. One typical type of single crystal electro-optical material used in electro-optic switching devices is lithium niobate ($LiNbO_3$).

Lithium niobate is a transparent material from ultraviolet to mid-infrared frequency range that exhibits electro-optic properties such as the Pockels effect. The Pockels effect is the optical phenomenon in which the refractive index of a medium, such as lithium niobate, varies with an applied electric field. The varied refractive index of the lithium niobate may be used to provide switching. The applied electrical field is provided to present day electro-optical switches by external control circuitry.

Although the switching speeds of these types of devices are very fast, for example on the order of nanoseconds, one disadvantage with present day electro-optic switching devices is that these devices generally require relatively high voltages in order to switch optical beams. Consequently, the external circuits utilized to control present day electro-optical switches are usually specially fabricated to generate the high voltages and suffer from large amounts of power consumption. In addition, integration of these external high voltage control circuits with present day electro-optical switches is becoming an increasingly challenging task as device dimensions continue to scale down and circuit densities continue to increase.

BRIEF DESCRIPTION OF THE DRAWINGS

The present invention is illustrated by way of example and not limitation in the accompanying figures.

DETAILED DESCRIPTION

Figure 1:
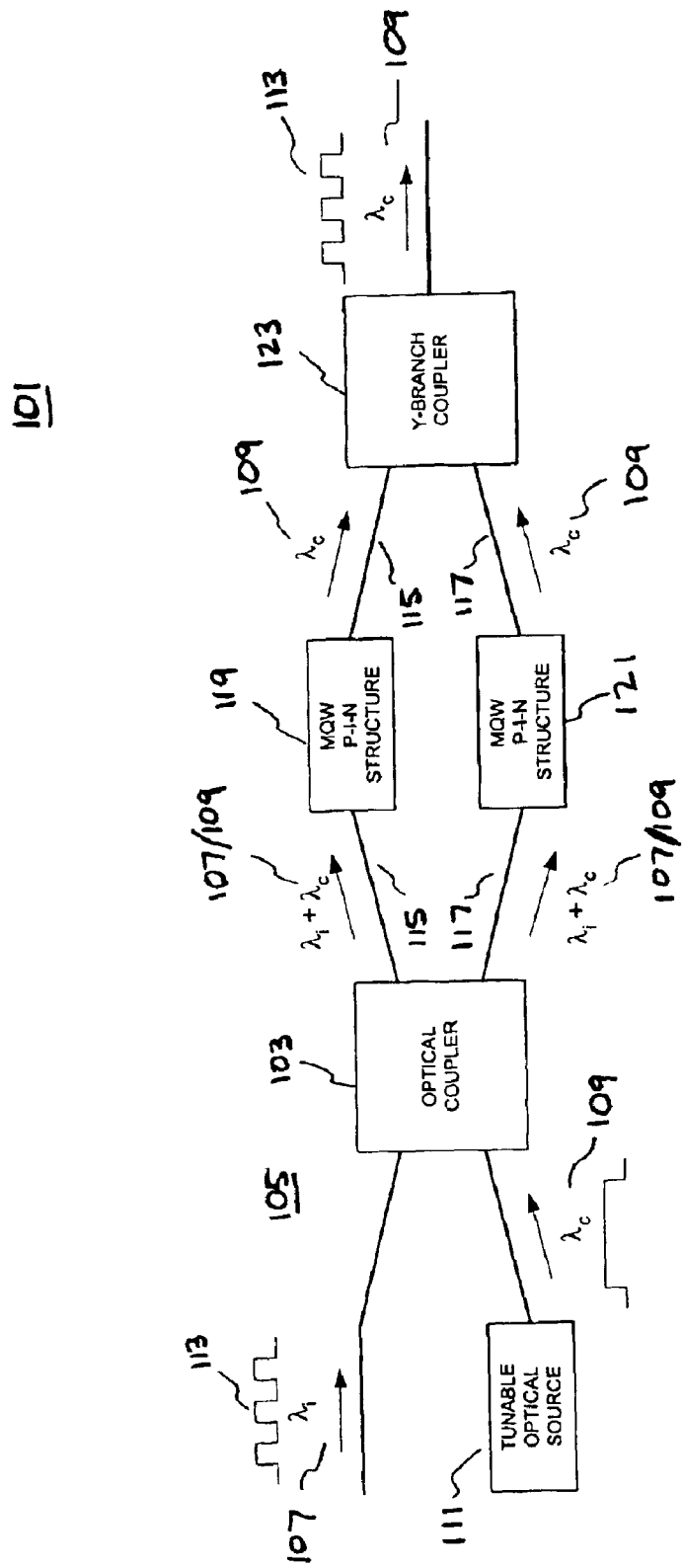
FIG. 1 is a block diagram illustrating generally one embodiment of an optical device including multiple quantum well (MQW) p-i-n structures to modulate an optical beam having a second wavelength in response to an optical beam having a first wavelength in accordance with the teachings of the present invention.

Methods and apparatuses for phase shifting, converting and modulating an optical beam with an optical device are disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments. In addition, it is appreciated that the figures provided herewith are for explanation purposes to persons ordinarily skilled in the art and that the drawings are not necessarily drawn to scale.

In one embodiment of the present invention, a tunable wavelength converter is provided in a fully integrated solution on a single integrated circuit chip. One embodiment of the presently described optical device is adapted to receive an input optical beam having a first wavelength on which a signal is encoded. The converter also includes a continuous wave (CW) tunable optical laser disposed in semiconductor material to generate an output optical beam having a tunable second wavelength. The input and output optical beams are both directed into respective inputs of a 2×2 optical coupler disposed in the semiconductor material. In one embodiment, the 2×2 optical coupler is adapted to split the input and output optical beams such that the split input and output optical beams co-propagate from the 2×2 optical coupler through first and second optical waveguides disposed in the semiconductor material. In one embodiment, these first and second optical waveguides from the 2×2 optical coupler form the two arms of a Mach-Zehnder interferometer (MZI).

In one embodiment, the first and second optical waveguides each include a multiple quantum well (MQW) p-i-n structure such as a reversed biased MQW p-i-n diode. In operation, the MQW p-i-n structures are adapted to absorb the split input optical beams having the first wavelength, but allow the split output optical beams from the CW tunable laser to propagate through the first and second optical waveguides. The absorption of the split input optical beams result in the photo-generation of electron-hole pairs or free charge carriers in the MQW p-i-n structures in response to the signal encoded on the input optical beam.

In one embodiment, these photo-generated free charge carriers provide a refractive index change in the MQW p-i-n structures through which the split output optical beams propagate. In one embodiment, the split output optical beams are therefore phase shifted in response to the refractive index change resulting in modulation of the output optical beam at Y-branch coupler adapted to recombine the phase shifted split output optical beam. In one embodiment, the modulation of the output optical beam substantially matches the signal encoded on the input optical beam. The modulation in the output optical beam is due to constructive and destructive interference of the split output optical beams.

In one embodiment, the wavelength of the output optical beam can be tuned in accordance with the teachings of the present invention so as to provide a tunable wavelength conversion of the input optical beam in the semiconductor material. Embodiments of the disclosed tunable wavelength converter can be used in a variety of high bandwidth applications including multi-processor, telecommunications, networking or the like.

To illustrate, FIG. 1 is a block diagram illustrating generally one embodiment of an optical device including multiple quantum well (MQW) p-i-n structures to modulate an optical beam having a second wavelength in response to an optical beam having a first wavelength in accordance with the teachings of the present invention. In particular, optical device 101 includes an optical coupler 103 disposed in semiconductor material 105. In one embodiment, semiconductor material 105 includes silicon on a silicon-on-insulator (SOI) structure. In one embodiment, optical coupler 103 includes two inputs and two outputs.

As shown in FIG. 1, one of the inputs of optical coupler 103 is a first optical beam 107 having a first wavelength $\lambda_i$. In one embodiment, a signal 113 is encoded on first optical beam 107. FIG. 1 also shows that the other one of the inputs of optical coupler is a second optical beam having a second wavelength $\lambda_c$. In one embodiment, the second optical beam is generated with a tunable optical source 111 disposed in semiconductor material 105. In one embodiment, the tunable optical source 111 includes a continuous wave (CW) tunable laser disposed in semiconductor material 105.

The CW tunable laser in one embodiment is constructed with a gain medium such as an InP diode and a tunable Bragg grating disposed in semiconductor material 105 as one of the reflectors defining the laser cavity of the CW tunable laser. In one embodiment, adjusting the tunable Bragg grating allows the second wavelength $\lambda_c$ to be tuned to any one of a range of channels. In one embodiment, the second wavelength $\lambda_c$ is in the range of approximately 1.55 $\mu$m and the first wavelength $\lambda_i$ is in the range of approximately 1.3 $\mu$m. It is appreciated of course that these wavelengths for $\lambda_i$ and $\lambda_c$ are provided for explanation purposes and that other wavelengths may be employed in other embodiments in accordance with the teachings of the present invention.

In one embodiment, optical coupler 103 is a 2×2 optical coupler and is adapted to split first optical beam 107 and the second optical beam 109 such that split first and second optical beams 107/109 co-propagate from optical coupler 103 through first and second optical waveguides 115 and 117. In one embodiment, optical couplers 103 may be realized with a multi-mode interference device (MMI) or other suitable types of optical coupling devices such as for example evanescent waveguide couplers or the like to split the input optical beams. The power splitting ratio of the optical coupler 103 may be different for the first and second wavelengths in accordance with the teachings of the present invention. In one embodiment, the splitting ratio is close to 50-50% for the input optical beam having the second wavelength $\lambda_c$. In one embodiment, optical waveguides 115 and 117 are single-mode rib waveguides disposed in semiconductor material 105. As can be appreciated from FIG. 1, optical waveguides 115 and 117 for the two arms of an MZI, which are later merged or combined at Y-branch coupler 123, disposed in semiconductor material 105.

As shown in the embodiment depicted in FIG. 1, a multiple quantum well (MQW) p-i-n structure 119 is included in optical waveguide 115 and a MQW p-i-n structure 121 is included in optical waveguide 117. In one embodiment, the MQW p-i-n structures 119 and 121 may have different lengths along the optical propagation direction in accordance with the teachings of the present invention. As will be discussed in greater detail below, in one embodiment, MQW p-i-n structures 119 and 121 include reverse biased Si/SiGe p-i-n MQW diodes. In operation, MQW p-i-n structures 119 and 121 are adapted to absorb the first optical beam 107 having the first wavelength $\lambda_i$, but allow the second optical beam 109 having the second wavelength $\lambda_c$ to continue to propagate. The absorption of the first optical beam 107 having the first wavelength $\lambda_i$ results in the photo-generation of electron-hole pairs or free charge carriers responsive to signal 113 in MQW p-i-n structures 119 and 121.

In one embodiment, with the photo-generation of free charge carriers in response to signal 113, the free charge carrier density is changed in MQW p-i-n structures 119 and 121 correspondingly, which results in a change in the refractive index of the intrinsic regions of the MQW p-i-n structures 119 and 121 due to plasma optical effects.

The plasma optical effect arises due to an interaction between the optical electric field vector and free charge carriers that may be present along the optical path of the optical beams propagating through MQW p-i-n structures 119 and 121 and first and second optical waveguides 115 and 117. The electric fields of the optical beams polarize the free charge carriers and these effectively perturb the local dielectric constant of the medium. This in turn leads to a perturbation of the propagation velocity of the optical wave and hence the index of refraction for the light, since the index of refraction is simply the ratio of the speed of the light in vacuum to that in the medium. Therefore, the index of refraction of MQW p-i-n structures 119 and 121 at the second wavelength $\lambda_c$ in the waveguide of optical device 101 is modulated in response to the signal 113 encoded on the input beam having the first wavelength $\lambda_i$ due to the photo generated free charge carriers. The modulated index of refraction in the first and second optical waveguides 115 and 117 correspondingly modulate the phases of split optical beams 109 propagating through first and second optical waveguides 115 and 117. In addition, the free charge carriers are accelerated by the field and lead to absorption of the optical field as optical energy is used up.

Generally, the refractive index perturbation is a complex number with the real part being that part which causes the velocity change and the imaginary part being related to the free charge carrier absorption. The amount of phase shift $\phi$ is given by $$\phi = (2\pi/\lambda)\Delta nL \qquad \text{(Equation 1)}$$

with the optical wavelength $\lambda$, the refractive index change $\Delta n$ and the interaction length L. In the case of the plasma optical effect in silicon, the refractive index change $\Delta n$ due to the electron ($\Delta N_e$) and hole ($\Delta N_h$) concentration change is given by:

$$\Delta n = -\frac{e^2\lambda^2}{8\pi^2 c^2 \varepsilon_0 n_0}\left(\frac{b_e(\Delta N_e)^{1.05}}{m_e^*} + \frac{b_h(\Delta N_h)^{0.8}}{m_h^*}\right) \qquad \text{(Equation 2)}$$

where $n_o$ is the nominal index of refraction for silicon, e is the electronic charge, c is the speed of light, $\varepsilon_0$ is the permittivity of free space, $m_e^*$ and $m_h^*$ are the electron and hole effective masses, respectively, $b_e$ and $b_h$ are fitting parameters.

Therefore, the change in the refractive index in the MQW p-i-n structures 119 and 121 results in a phase shift in the split second optical beams 109 having the second wavelength $\lambda_c$, which continue to propagate through the MQW p-i-n structures 119 and 121 until the split second optical beams 109 are recombined or merged in Y-branch coupler 123. In one embodiment, the merged second optical beam 109 is modulated as a result of constructive or destructive interference in Y-branch coupler 123 such that signal 113 is encoded on second optical beam 109 as shown in embodiment depicted in FIG. 1.

Figure 2:
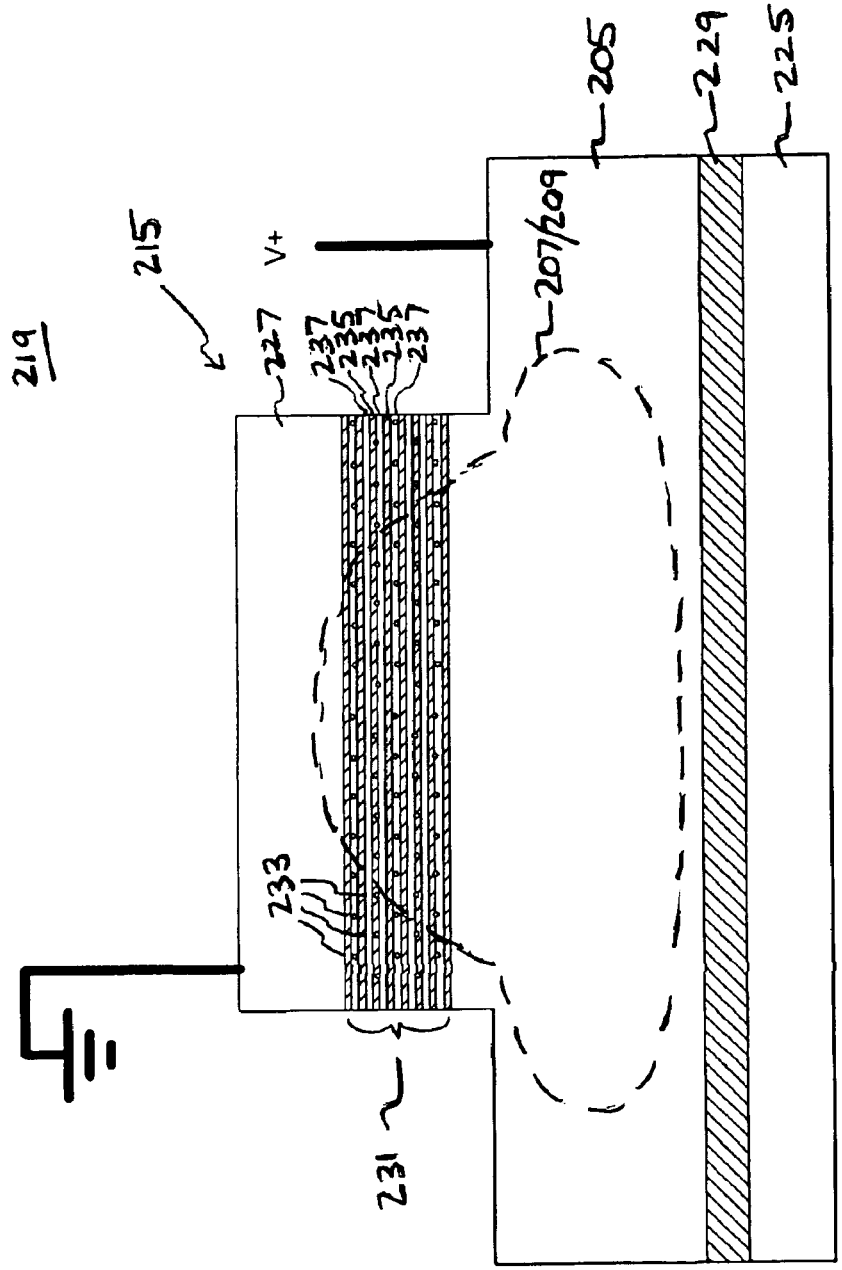
FIG. 2 is a cross section diagram illustrating generally a MQW p-i-n structure to phase shift an optical beam having a second wavelength in response to an optical beam having a first wavelength in accordance with the teachings of the present invention.

FIG. 2 is a cross section diagram illustrating generally one embodiment of a MQW p-i-n structure 219 to phase shift a second optical beam 209 having a second wavelength in response to an optical beam 207 having a first wavelength in accordance with the teachings of the present invention. It is appreciated that MQW p-i-n structure 219 in one embodiment could be used in place of one or both MQW p-i-n structures 119 and 121 of FIG. 1. In one embodiment, MQW p-i-n structure 219 is a Si/SiGe p-i-n MQW diode including a n doped semiconductor region 205, and a p doped semiconductor region 227 with an intrinsic SiGe MQW region 231 disposed between the p and n doped regions 227 and 205. It is appreciated that silicon is substantially transparent in the wavelength range from at least 1.3 $\mu$m to 1.6 $\mu$m.

A single quantum well is a three-layer structure in which the well layer 235, (e.g. SiGe) is embedded between the intrinsic semiconductor (e.g. silicon) layers 237. As illustrated in FIG. 2, SiGe MQW region 231 includes a plurality of layers of intrinsic semiconductor material 237, e.g. silicon, with well layers 235, e.g. SiGe, disposed between the intrinsic semiconductor material 227 layers. In one embodiment, the thickness of each well layer 235 is very small, such as for example 4 nm, and the barrier layers of intrinsic semiconductor material 227 are wider in the range of 21 nm in thickness.

As shown in the depicted embodiment, the Si/SiGe p-i-n MQW diode is reversed biased with the p doped region 227 coupled to ground and the n doped region 205 coupled to voltage V. It is appreciated of course the polarities of p and n doped regions 227 and 205 and voltage V and ground couplings could be reversed in alternate embodiments in accordance with the teachings of the present invention.

FIG. 2 shows that one embodiment of MQW p-i-n structure 219 is fabricated on a SOI wafer and therefore includes a buried insulating layer 229 and a layer of semiconductor material 225. In one embodiment, MQW p-i-n structure 219 is included in an optical waveguide 215. Although optical waveguide 215 has been illustrated as a rib waveguide in FIG. 2, it is appreciated that other suitable types of optical waveguides such as for example strip waveguides or the like could be utilized in other embodiments according to the teachings of the present invention.

In operation, optical beams 207 and 209 co-propagate along an optical path through optical waveguide 215 through MQW p-i-n structure 219 as shown in FIG. 2. In the illustrated embodiment, buried insulating layer serves as cladding to help confine optical beams 207/209 in the optical waveguide 215. In one embodiment, optical beam 207 has a wavelength of approximately 1.3 $\mu$m and a signal encoded thereon. Optical beam 209 has a wavelength of approximately 1.55 $\mu$m. With a proper Ge composition in one embodiment, the reversed biased Si/SiGe p-i-n MQW diode will absorb optical beam 207. As a result of absorbing optical beam 207, free charge carriers 233 including electron-hole pairs are generated in intrinsic SiGe MQW region 231, which induce a refractive index change due to the plasma optical effect as discussed above in response to the signal encoded in optical beam 207. The light induced change in refractive index leads to a phase shift optical beam 209, which continues to propagate through waveguide 215.

Referring back to FIG. 1, the light induced phase shifts in split optical beams 109 in MQW p-i-n structures 119 and 121 in one embodiment are adapted to cause relative phase difference between the split optical beams 109 propagating through waveguides 115 and 117 or the two arms of the MZI in response to signal 113. As a result, constructive and destructive interference at Y-branch coupler 123 will cause signal 113 to be encoded on optical beam 109, which is output from Y-branch coupler 123.

Therefore, optical device 101 effectively converts optical beam 107 having a wavelength $\lambda_i$ and having signal 113 encoded thereon to optical beam 109 having wavelength $\lambda_c$ and having signal 113 encoded thereon in accordance with the teachings of the present invention. In addition, the wavelength $\lambda_c$ output from optical device 101 can be adjusted or tuned by adjusting or tuning the output optical beam from tunable optical device 111.

Figure 3:
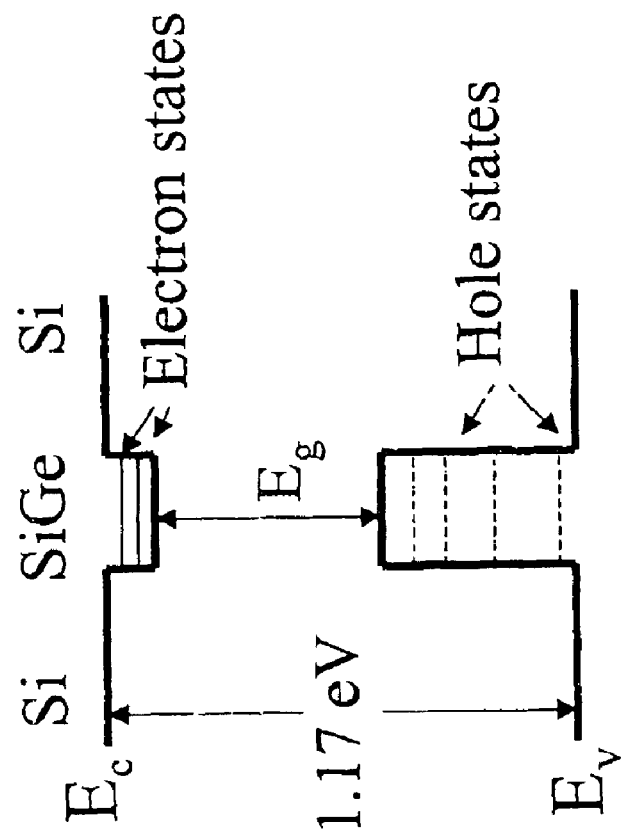
FIG. 3 is an energy band diagram illustrating generally the band gap energy levels associated with an MQW p-i-n structure in accordance with the teachings of the present invention.

FIG. 3 is an energy band diagram 331 illustrating generally the band gap energy levels associated with a MQW p-i-n structure in accordance with the teachings of the present invention. As illustrated above in the embodiment of FIG. 2, MQW region 231 includes many quantum well layers 235. Due to the different band gap energies for SiGe and Si as shown in FIG. 3, there is an offset for the conduction band $E_c$ and the valance band $E_v$ for the well layers 235 and the barrier intrinsic semiconductor layers 237. Therefore, there is a quantum size effect for both electrons and holes in MQW region 231 in accordance with the teachings of the present invention. Optical absorption occurs when the wavelength is short enough so that the photon energy, $hc/\lambda$, where h is Planck's constant, is larger than the interband transition energy of the quantum well or energy band gap for the bulk semiconductors. Therefore, the absorption edge of the MQW structures depends on the Ge composition as well as the quantum well layer (SiGe) thickness, which determine the interband transition energy between the quantized electron and hole states. The Si/SiGe quantum wells employed in the MQW p-i-n structures employed in embodiments of the present invention are adapted to absorb optical beams having wavelengths in the range of approximately 1.3 μm compared to Si, which absorbs optical beams having shorter wavelengths such as 0.85 μm or less.

Figure 4:
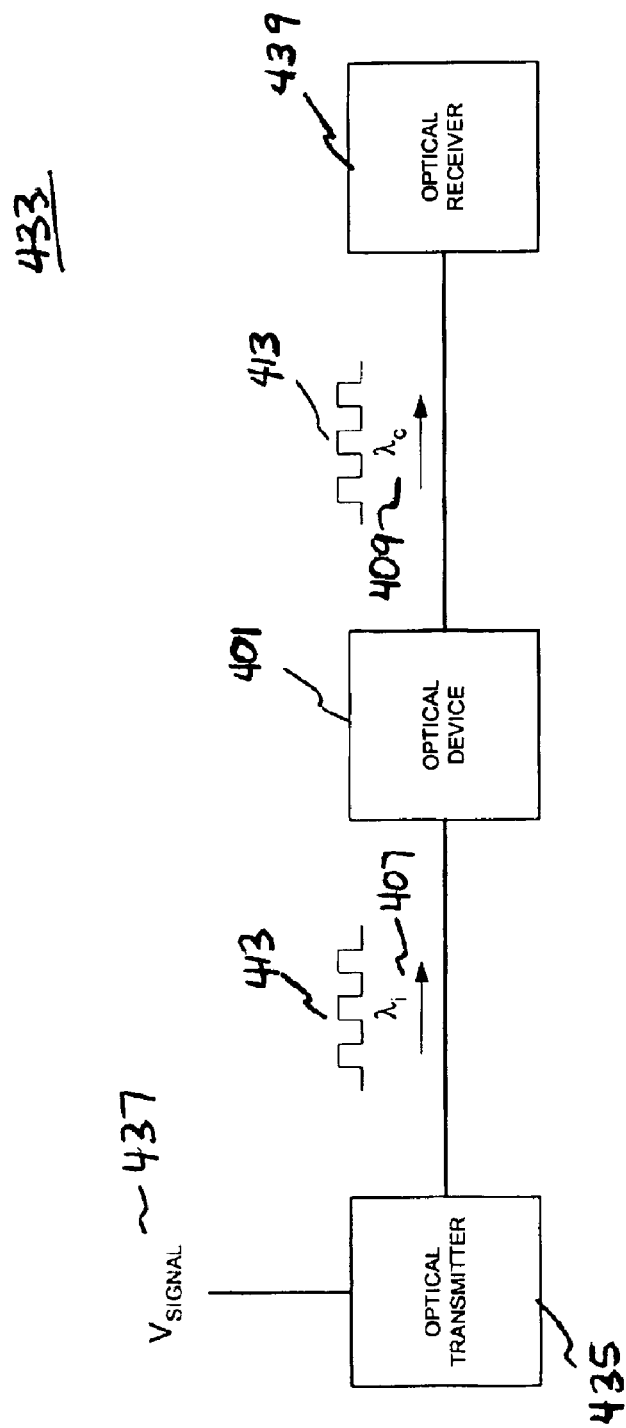
FIG. 4 is a block diagram illustration of one embodiment of a system including an optical device to convert an optical beam having a first wavelength with a signal encoded thereon into a second optical beam having a second wavelength with the signal encoded thereon according to embodiments of the present invention.

FIG. 4 is a block diagram illustration of one embodiment of a system including an optical device to convert an optical beam having a first wavelength with a signal encoded thereon into a second optical beam having a second wavelength with the signal encoded thereon according to embodiments of the present invention. In particular, FIG. 4 shows optical system 433 including an optical transmitter 435 and an optical receiver 439. In one embodiment, optical system 433 also includes an optical device 401 optically coupled between optical transmitter 435 and optical receiver 439. As shown in FIG. 4, optical transmitter 435 is coupled to receive a signal $V_{SIGNAL}$ 437 and transmits an optical beam 407 having a wavelength $\lambda_i$. A signal 413 is encoded on optical beam 407 in response to $V_{SIGNAL}$ 437. In one embodiment, optical device has the effect of converting the wavelength $\lambda_i$ to $\lambda_c$ as illustrated in FIG. 4 with optical beam 409 output from optical device 401 with a wavelength of $\lambda_c$ and having signal 413 encoded thereon. In one embodiment, $\lambda_i$ is in the range of approximately 1.3 μm and $\lambda_c$ is in the range of approximately 1.55 μm. Accordingly, optical receiver 439 receives signal 413 on optical beam 409 at the converted wavelength $\lambda_c$ in accordance with the teachings of the present invention. In one embodiment, optical device 401 may include optical device 101 with MQW p-i-n structures as described in FIGS. 1–3.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. An apparatus, comprising:
   a 2×2 optical coupler disposed in semiconductor material, the 2×2 optical coupler having first and second optical inputs to receive a first optical beam having a first wavelength and a second optical beam having a second wavelength, respectively;
   first and second waveguides disposed in the semiconductor material coupled to first and second outputs of the 2×2 optical coupler, respectively;
   first and second Si/SiGe multiple quantum well (MQW) p-i-n diodes disposed in the semiconductor material in the first and second waveguides, respectively; and
   a Y-branch coupler disposed in the semiconductor material to the first and second waveguides, respectively; such that a signal encoded onto the first optical beam at the first wavelength is encoded onto the second optical beam at the second wavelength is output from the Y-branch coupler.

2. The apparatus of claim 1 wherein the first and second Si/SiGe MQW p-i-n diodes are coupled to be reversed biased.

3. The apparatus of claim 1 wherein the first wavelength is approximately 1.3 mm.

4. The apparatus of claim 1 wherein the second wavelength is approximately 1.55 mm.

5. The apparatus of claim 1 further comprising a continuous-wave (CW) laser optically coupled to the second optical input of the 2×2 optical coupler to generate the second optical beam.

6. The apparatus of claim 5 wherein the CW laser comprises a CW tunable laser disposed in the semiconductor material.

7. The apparatus of claim 1 wherein the first and second waveguides comprise first and second rib waveguides, respectively.

8. The apparatus of claim 1 wherein the 2×2 optical coupler is adapted to split the first and second optical beams such that split first and second optical beams co-propagate through the first and second waveguides to the first and second Si/SiGe MQW p-i-n diodes.

9. The apparatus of claim 8 wherein the first and second Si/SiGe MQW p-i-n diodes are adapted to absorb the first optical beam to photo generate free charge carriers in the first and second Si/SiGe MQW p-i-n diodes in response to the signal encoded onto the first optical beam.

10. The apparatus of claim 9 wherein a relative phase difference between the split second optical beams is adjusted in response to the photo generated free charge carriers in the first and second Si/SiGe MQW p-i-n diodes.

11. The apparatus of claim 10 wherein the second optical beam is modulated in response to the photo generated free charge carriers in the first and second Si/SiGe MQW p-i-n diodes at an output of the Y-branch coupler from interference between the split second optical beams.

12. A method, comprising:
   splitting first and second optical beams having first wavelength and second wavelengths, respectively, into split first and second optical beams that co-propagate through first and second waveguides disposed in semiconductor material, the first optical beam having a signal encoded thereon;
   generating free charge carriers in response to the signal encoded on the first optical beam in first and second Si/SiGe multiple quantum well (MQW) p-i-n diodes disposed in the first and second waveguides, respectively;
   phase shifting the split second optical beams in response to the generated free charge carriers in the first and second Si/SiGe MQW p-i-n diodes; and
   combining the phase shifted split second optical beams to modulate the second optical beam.

13. The method of claim 12 further comprising absorbing the split first optical beams in the first and second Si/SiGe MQW p-i-n diodes to generate the free charge carriers in the first and second Si/SiGe MQW p-i-n diodes.

14. The method of claim 12 further comprising directing the first and second optical beams into first and second inputs of a 2×2 optical coupler disposed in the semiconductor material, the 2×2 optical coupler to split the first and second optical beams into the split first and second optical beams that co-propagate through the first and second waveguides from the 2×2 optical coupler.

15. The method of claim 12 wherein combining the phase shifted split second optical beams comprises directing the phase shifted split second optical beams into a Y-branch coupler disposed in the semiconductor material.

16. The method of claim 15 wherein the second optical beam is modulated in response to constructive and destructive interference in the Y-branch coupler.

17. The method of claim 12 further comprising reverse biasing the first and second Si/SiGe MQW p-i-n diodes.

18. The method of claim 12 further comprising adjusting the second wavelength.

19. A system, comprising:
an optical transmitter to generate a first optical beam having a first wavelength, the first optical beam having a signal encoded thereon;
an optical source to generate a second optical beam having a second wavelength;
an optical device coupled to receive the first and second optical beams, the optical device including
a 2×2 optical coupler disposed in semiconductor material, the 2×2 optical coupler having first and second optical inputs to receive the first second optical beams, respectively;
first and second waveguides disposed in the semiconductor material coupled to first and second outputs of the 2×2 optical coupler, respectively;
first and second Si/SiGe multiple quantum well (MQW) p-i-n diodes disposed in the semiconductor material in the first and second waveguides, respectively; and
a Y-branch coupler disposed in the semiconductor material to the first and second waveguides, respectively; such that the signal encoded onto the first optical beam is encoded onto the second optical beam at the second wavelength is output from the Y-branch coupler; and
an optical receiver coupled to the output of the Y-branch coupler to receive the second optical beam with the signal encoded thereon.

20. The system of claim 19 wherein the optical source comprises a tunable optical laser.

21. The system of claim 20 wherein the tunable optical laser comprises a continuous wave (CW) tunable optical laser disposed in the semiconductor material.

22. The system of claim 19 wherein the first wavelength is in the range of approximately 1.3 mm and the second wavelength is in the range of approximately 1.55 mm.

23. The system of claim 19 wherein the first and second Si/SiGe MQW p-i-n diodes are reversed biased.

24. The system of claim 19 wherein the first and second Si/SiGe MQW p-i-n diodes are adapted to absorb the first optical beam and allow the second optical beam to propagate.

25. The system of claim 24 wherein the first and second Si/SiGe MQW p-i-n diodes are adapted to generate free charge carriers in response to the signal encoded on the first optical beam.

26. The system of claim 25 wherein the free charge carriers comprise electron-hole pairs.

* * * * *